US006571713B1

(12) United States Patent
Koga

(10) Patent No.: US 6,571,713 B1
(45) Date of Patent: Jun. 3, 2003

(54) GAS GENERATOR, VESSEL THEREFOR AND METHOD OF MANUFACTURING THE VESSEL

(75) Inventor: Koji Koga, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/497,165

(22) Filed: Feb. 3, 2000

(30) Foreign Application Priority Data

Feb. 12, 1999 (JP) ............................................. 11-034415

(51) Int. Cl.⁷ .......................... F42B 14/00; B60R 21/28
(52) U.S. Cl. ....................... 102/288; 102/289; 102/530; 280/741
(58) Field of Search ............................... 280/736, 741; 102/530, 531, 288, 289; 29/522.1

(56) References Cited

U.S. PATENT DOCUMENTS

| 4,015,765 | A | * | 4/1977 | Ahmed | 228/131 |
| 5,564,743 | A | * | 10/1996 | Marchant | 280/741 |
| 5,799,973 | A | | 9/1998 | Bauer et al. | 280/741 |
| 5,863,066 | A | * | 1/1999 | Blumenthal | 280/737 |
| 5,934,705 | A | * | 8/1999 | Siddiqui et al. | 280/736 |
| 6,050,599 | A | * | 4/2000 | Marsaud et al. | 280/736 |
| 6,089,598 | A | * | 7/2000 | Snyder et al. | 280/740 |
| 6,095,560 | A | * | 8/2000 | Perotto | 280/741 |
| 6,095,561 | A | * | 8/2000 | Siddiqui et al. | 280/742 |
| 6,149,193 | A | * | 11/2000 | Canterberry et al. | 280/741 |
| 6,244,301 | B1 | | 6/2001 | Scott et al. | 139/89 |

FOREIGN PATENT DOCUMENTS

| EP | 0 841 209 | 5/1998 |
| JP | 07-164938 | 6/1995 |
| JP | 07-164939 | 6/1995 |
| JP | 10-329638 | 12/1998 |

* cited by examiner

Primary Examiner—Peter A. Nelson

(57) ABSTRACT

A vessel for a gas generator is formed of a cylindrical body, and at least one partition wall situated inside the body to divide the interior of the body into a plurality of chambers. The partition wall has a plastic deforming portion at an outer periphery thereof, which closely contacts an inner peripheral surface of the vessel by causing plastic deformation in a diameter-increasing direction. The partition wall can be easily secured to the vessel, and the vessel can be manufactured at a low cost.

11 Claims, 3 Drawing Sheets

GAS GENERATOR, VESSEL THEREFOR AND METHOD OF MANUFACTURING THE VESSEL

BACKGROUND OF THE INVENTION AND RELATED ART STATEMENT

The present invention relates to a gas generator assembled in an airbag device and the like, a vessel for the gas generator and a method of manufacturing the vessel. More particularly, the pesent invention relates to a vessel in which a securing structure of a partition wall in the vessel is improved, a method of manufacturing the vessel and a gas generator using the vessel.

As a gas generator used in an airbag device and the like, there is a gas generator arranged such that the interior of a cylindrical vessel is separated into a plurality of chambers by ;a partition wall, and each chamber is filled with a gas generating agent as well as provided with an igniter. An mount of a gas ejected from the gas generator and a period of time during which the ejection of the gas continues can be controlled by energizing the igniters at a different timing or by energizing only a portion of the igniters.

The partition wall is conventionally secured to the vessel by pre-fitting and deforming the vessel inward as disclosed in U.S. Pat. No. 5,799,973 and Japanese Patent Publication (KOKAI) No. 10-329638.

Since the vessel is formed strong, a device for uniformly deforming and press-fitting the vessel in a diameter-reducing direction is considerably complex in construction.

An object of the present invention is to provide a vessel for a gas generator, wherein a partition wall can be easily formed in the vessel.

Another object of the invention is to provide a method of manufacturing the vessel for the gas generator relatively easily.

A further object of the invention is to provide a gas generator using the above vessel.

Further objects and advantages of the invention will be apparent from the following description of the invention.

SUMMARY OF THE INVENTION

A vessel for a gas generator of the present invention has a cylindrical shape. The interior of the cylindrical vessel is partitioned into a plurality of chambers by a partition wall, and the outer peripheral surface of the partition wall closely contacts the inner peripheral surface of the vessel. The partition wall is caused to closely contact the inner peripheral surface of the vessel by plastically deforming the partition wall in a diameter-increasing direction, i.e. radially outwardly thereof.

Preferably, an annular portion is formed along the outer periphery of the partition wall and is caused to come into intimate contact with the inner peripheral surface of the vessel by plastic deformation.

It is sufficient only to press the partition wall with tools, such as punches or the like, inserted from both ends of the vessel to plastically deform the partition wall as described above, and accordingly a device for fixing the partition wall is very simple. Further, when the annular portion is plastically deformed, it can be easily plastically deformed by a concentrating press force to the annular portion. In addition, since the partition wall is in intimate contact with the inner peripheral surface of the vessel in a large area, a gas sealing property can be enhanced.

A gas generator of the present invention includes the vessel, gas generating agents filled in the respective chambers in the vessel, and igniters disposed in the respective chambers for starting gas generating reaction of the gas generating agents.

DETAILED DESCRIPTION OF PREFERRED EMBODIMENTS

Figure 1:
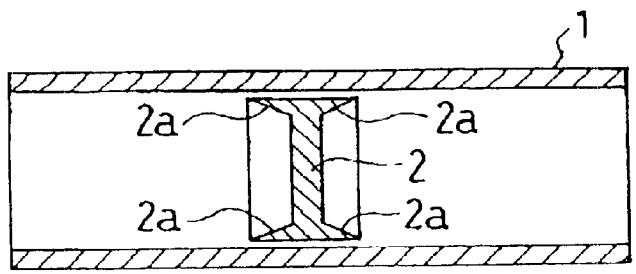
FIG. 1 is a sectional view showing a step of manufacturing a, vessel according to an embodiment.
Figure 2:
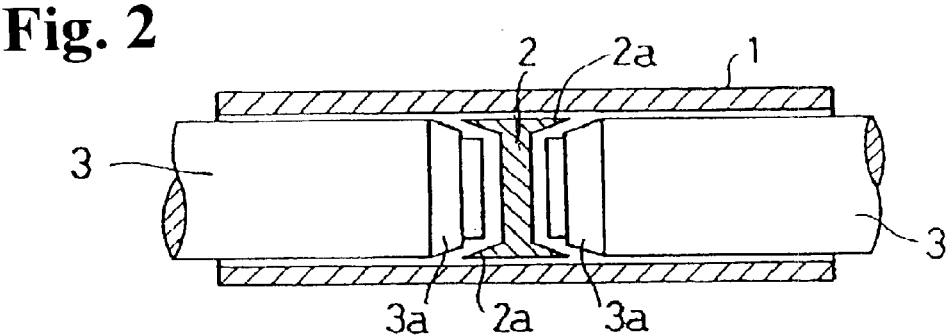
FIG. 2 is a sectional view showing a step of manufacturing the vessel according to the embodiment.
Figure 3:
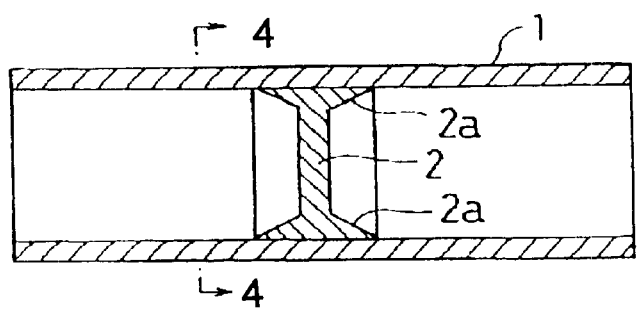
FIG. 3 is a sectional view of the vessel prepared according to the embodiment.
Figure 4:
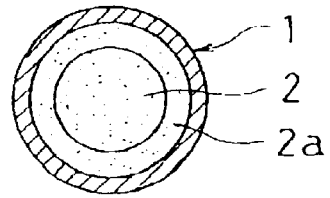
FIG. 4 is a sectional view taken along line 4—4 in FIG. 3.

Embodiments will be described below with reference to accompanying drawings. FIGS. 1–3 are views showing the steps of manufacturing a vessel according to an embodiment, and FIG. 4 is a sectional view taken along line 4—4 of FIG. 3.

The vessel 1 is of a cylindrical shape and a partition wall 2 is of an approximately disc shape. Annular portions 2a are formed on both disc surfaces of the partition wall 2 along the outer peripheries thereof.

In the embodiment, the cross-section of the projection of each annular portion 2a is formed in a triangular shape whose height is increased from the disc surface as the location thereof comes close to the outer periphery.

The partition wall 2 is disposed at a predetermined position in the vessel 1, and tools 3, such as punches or the like, are inserted into the vessel 1 from both ends thereof. A slender taper surface 3a is formed around the outer peripheral edge of each tool 3 at the extreme end thereof. As the partition wall 2 is pressed by the tools 3 from both sides, the taper surfaces 3a press the annular portions 2a in a diameter-increasing, i.e. radially outward, direction to plastically deform the same, whereby the annular portions 2a are caused to intimate contact with the inner peripheral surface of the vessel 1. With this arrangement, the vessel 1 in which the partition wall 2 comes into intimate contact with the inner peripheral surface is manufactured as shown in FIGS. 3 and 4.

The vessel 1 with the partition wall 2 can be easily manufactured by a simple device for pressing and moving the tools 3 in mutually approaching directions. Moreover, the sealing property of the vessel 1 is very good because the annular portions 2a are formed on the partition wall 2 so as to increase the intimate contact areas of the partition wall 2 with the inner peripheral surface of the vessel 1.

Figure 5:
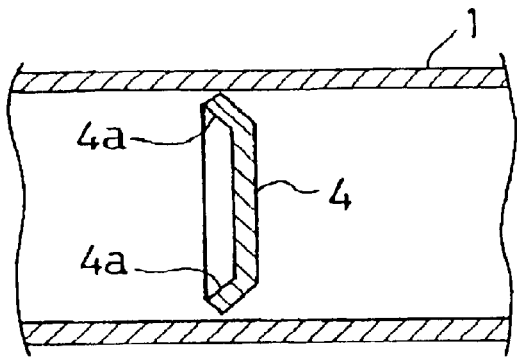
FIG. 5 is a sectional view showing a step of manufacturing a vessel according to another embodiment.
Figure 6:
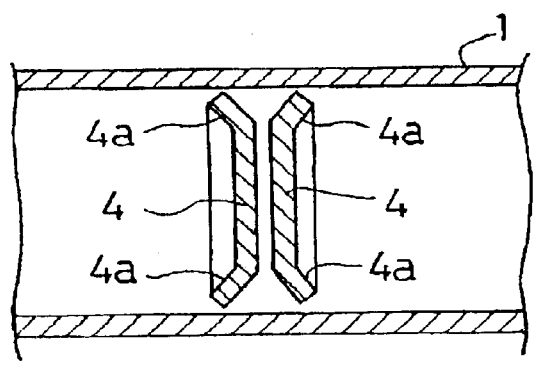
FIG. 6 is a sectional view showing a step of manufacturing a vessel according to a further embodiment.
Figure 7:
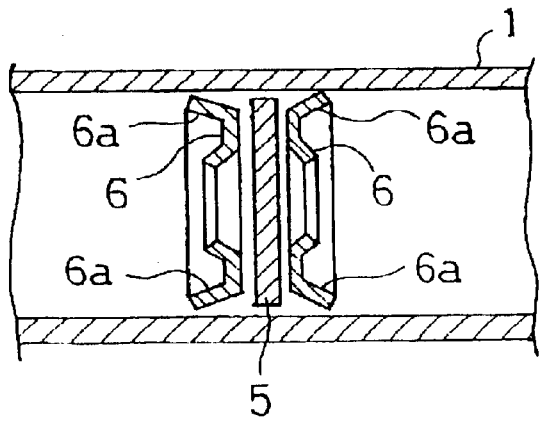
FIG. 7 is a sectional view showing a step of manufacturing a vessel according to a different embodiment.

FIGS. 5–7 show partition walls which are used in vessels according to different embodiments, respectively. In FIG. 5, a partition wall 4 has an annular portion 4a formed on only one disc surface thereof. In FIG. 6, two partition walls 4, which are placed to face each other through the surfaces where the annular portions 4a are not formed, are disposed in a vessel 1. In FIG. 7, two partition walls 6, each having an annular portion 6a formed on only one disc surface thereof, and a flat partition wall 5 are disposed in a vessel 1. Incidentally, the partition walls 6 confront with each other through the surfaces where the annular portions 6a are not formed.

In FIGS. 5–7, the partition wall(s) can be simply secured by inserting the tools into the vessel 1 from both ends thereof, plastically deforming the annular portion(s) 4a or 6a in the diameter-increasing direction, and causing them to closely contact the inner peripheral surface of the vessel 1. Also, the sealing property between the partition wall(s) and the vessel can be made sufficiently.

Figure 8:
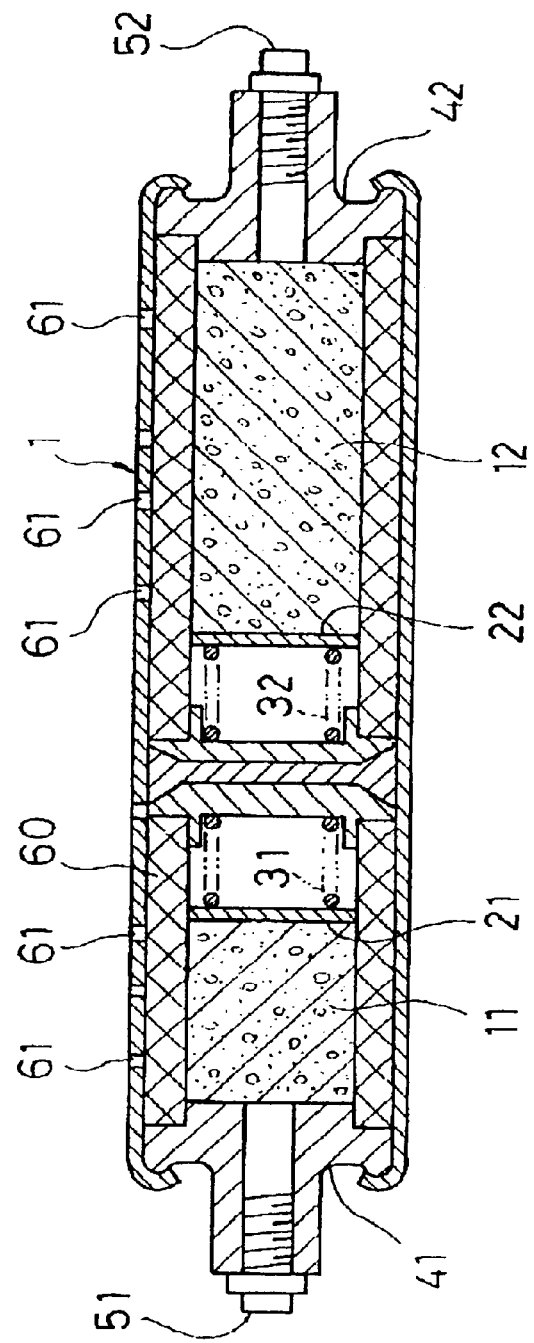
FIG. 8 is a sectional view of a gas generator provided with a partition wall shown in FIG. 1.

FIG. 8 is a sectional view of a gas generator using the vessel 1 having the partition wall 2 of FIG. 1.

A first chamber on the left side of the partition wall 2 in the vessel 1 and a second chamber on the right side thereof are filled with gas generating agents 11 and 12, respectively. Note that plates 21 and 22 are respectively interposed between the partition walls 2 and the gas generating agents 11 and 12, and the plates 21 and 22 are pressed in the directions of the ends of the vessel with springs 31 and 32. Also, spring receiving seats 33 and 34 are disposed on both sides of the partition wall 2.

Both ends of the vessel 1 are sealed with end members 41, 42. The end members 41, 42 are secured to the vessel 1 by press-fitting and deforming both ends of the vessel 1 inward. Igniters 51 and 52 are secured to the end members 41 and 42 by screw or the like, respectively. The gas generating agents 11 and 12 start reaction by energizing the igniters 51 and 52 to thereby generate gases. The gases pass through a gas filter 60 and are ejected from the gas ejecting ports 61 of the vessel 1. Incidentally, only one of the igniters 51 and 52 may be energized or both of them may be energized. When both of them are energized, the energizing timing may be the same or different.

While the interior of the vessel is partitioned into the two chambers by the partition wall in the above embodiments, the vessel may be partitioned into three chambers or more by a plurality of partition walls.

As described above, according to the present invention, the partition wall can be easily secured in the vessel for the gas generator, and the vessel can be manufactured at a low cost. Further, a very high sealing property can be obtained by increasing the area where the partition wall is in intimate contact with the vessel. According to the present invention, the gas generator having the vessel with the partition wall can be formed at a low cost.

While the invention has been explained with reference to the specific embodiments of the invention, the explanation is illustrative and the invention is limited only by the appended claims.

What is claimed is:

1. A vessel for a gas generator, comprising:
   a cylindrical body having a smooth outer surface without a press-fitting dent, and
   at least one partition wall situated inside the body to divide an interior of the body into a plurality of chambers, said at least one partition wall having at least one annular portion formed along an outer periphery thereof and projecting at an angle with respect to a center plane of the at least one partition wall, said at least one annular portion forming a plastic deforming portion closely contacting an inner peripheral surface of the vessel by plastic deformation in radial directions.

2. A vessel for a gas generator according to claim 1, wherein said at least one partition wall includes a central area with a central surface, said annular portion projecting outwardly from a peripheral of the central area with an acute angle with respect to the central surface.

3. A vessel for a gas generator according to claim 2, wherein said at least one partition wall includes two annular portions extending in opposite directions relative to the central area.

4. A vessel for a gas generator according to claim 2, wherein two partition walls are situated in the cylindrical body such that the annular portions of the partition walls project in opposite directions, respectively.

5. A vessel for a gas generator according to claim 4, further comprising a plane wall situated between the two partition walls.

6. A vessel for a gas generator according to claim 1, wherein said at least one annular portion is substantially deformed when the plastic deforming portion closely contacts the inner peripheral surface of the vessel.

7. A method of manufacturing a vessel for a gas generator, comprising:
   inserting a disc-shaped partition wall with an annular portion into a cylindrical vessel, said annular portion being formed along an outer periphery thereof and projecting at an angle with respect to a center plane of the partition wall; and
   pressing the annular portion of the partition wall radially outwardly of the vessel to plastically deform the annular portion so that an outer peripheral surface of annular portion of the partition wall closely contacts an inner peripheral surface of the vessel while keeping the vessel to have a smooth outer surface without a press-fitting dent.

8. A method of manufacturing a vessel according to claim 7, wherein said partition wall is pressed from two opposite sides along a longitudinal direction of the vessel.

9. A method of manufacturing a vessel according to claim 8, wherein said partition wall is expanded radially outwardly by a press.

10. A method of manufacturing a vessel according to claim 7, wherein two disc-shaped partition walls with annular portions are disposed in the vessel such that the annular portions project in opposite directions, said annular portions being pressed to substantially deform and contact the inner peripheral surface of the vessel.

11. A gas generator comprising the vessel according to claim 1, gas generating agents filled in chambers in the vessel divided by the partition wall, and igniters disposed in the respective chambers for starting gas generating reaction of the gas generating agents.

* * * * *